United States Patent [19]

Ishii et al.

[11] 4,419,335

[45] Dec. 6, 1983

[54] PROCESS FOR PRODUCING RHOMBOHEDRAL SYSTEM BORON NITRIDE

[75] Inventors: Toshihiko Ishii; Tadao Sato, both of Sakura, Japan

[73] Assignee: National Institute for Researches in Inorganic Materials, Ibaraki, Japan

[21] Appl. No.: 356,784

[22] Filed: Mar. 10, 1982

[30] Foreign Application Priority Data

Oct. 26, 1981 [JP] Japan ................................ 56-171249

[51] Int. Cl.³ ............................................ C01B 21/06
[52] U.S. Cl. ................................................. 423/290
[58] Field of Search ......................................... 423/290

[56] References Cited

U.S. PATENT DOCUMENTS

| | | | |
|---|---|---|---|
| 1,135,232 | 4/1915 | Weintraub | 423/290 |
| 2,839,366 | 6/1958 | Kamlet | 423/290 |
| 3,232,706 | 2/1966 | Kuhn | 423/290 |

FOREIGN PATENT DOCUMENTS

| | | | |
|---|---|---|---|
| 1511902 | 12/1967 | France | 423/290 |
| 46-9472 | 10/1972 | Japan | 423/290 |
| 483201 | 4/1938 | United Kingdom | 423/290 |

OTHER PUBLICATIONS

Mellor, J. W.,; *Comp. Treat on Inorg. & Theor. Chem.*, vol. 8, Longmans, Green & Co.; N.Y. 1928, p. 109.
Williams, Herbert E. *The Chemistry of Cyanogen Compounds* London J & A Churchill copyright 1915, p. 3.
T. Ishii, T. Sato, Y. Sekikawa and M. Iawata, *Journal of Crystal Growth*, vol. 52, Part 1, 285–289 (1981).
T. Ishii, T. Sato, Y. Sekikawa and Y. Matsui, *Journal of Materials Science*, vol. 16, 1114–1116 (1981).
Herold et al., Compt. Rend, 246, 1866–1868 (1958).

*Primary Examiner*—Herbert T. Carter
*Assistant Examiner*—Jackson Leeds
*Attorney, Agent, or Firm*—Oblon, Fisher, Spivak, McClelland & Maier

[57] ABSTRACT

Rhombohedral system boron nitride is produced by heating a boron material selected from the group consisting of boron oxide, boric acid and an oxygen-containing boron compound capable of forming boron oxide when heated, at a temperature of from 1200° to 2100° C. to vaporize boron oxide and reacting the vaporized boron oxide with hydrogen cyanide or cyanogen gas.

10 Claims, 3 Drawing Figures

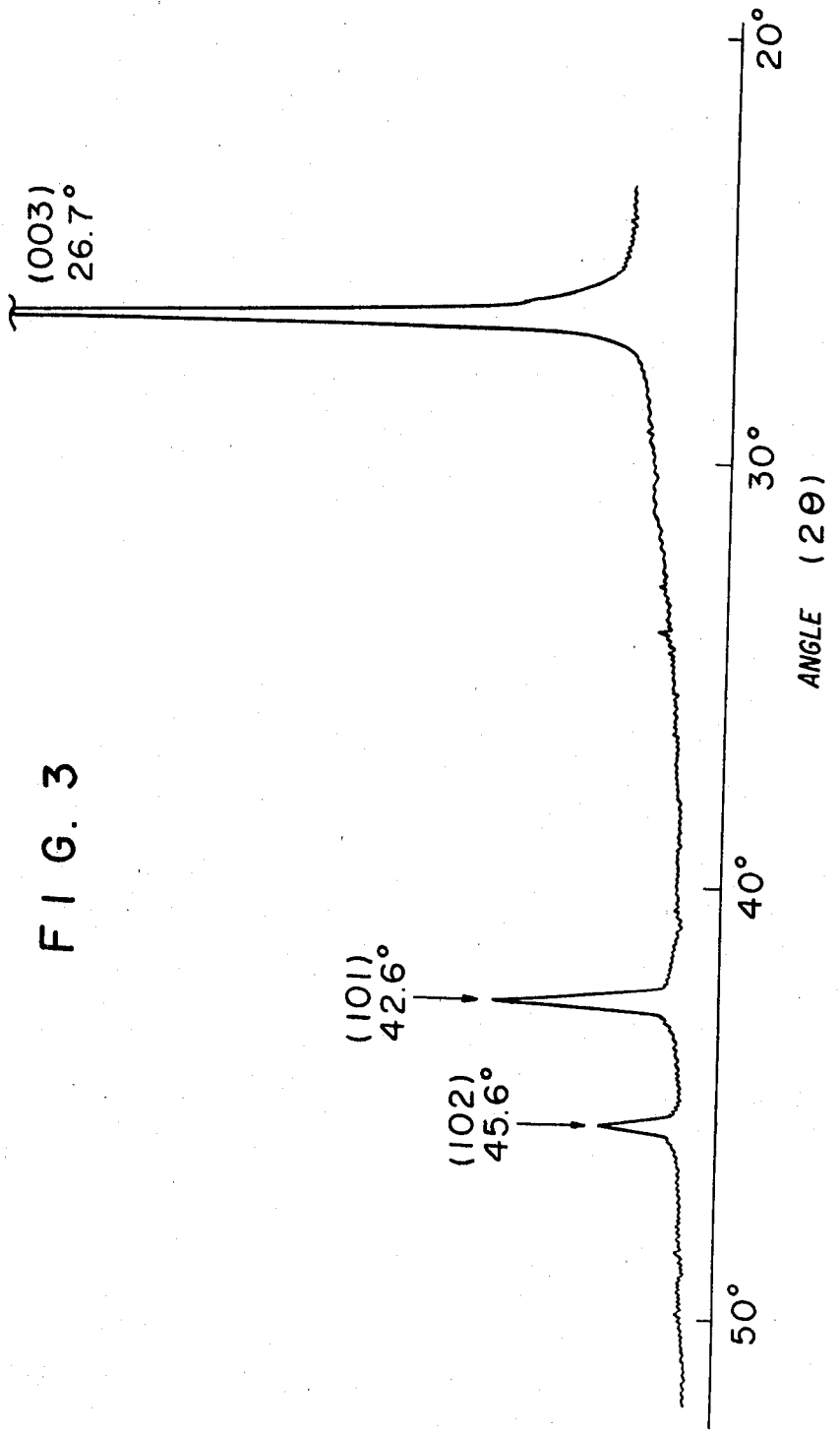

PROCESS FOR PRODUCING RHOMBOHEDRAL SYSTEM BORON NITRIDE

BACKGROUND OF THE INVENTION

1. Field of the Invention

The present invention relates to a process for producing rhombohedral system boron nitride.

2. Description of the Prior Art

A conventional process for the production of rhombohedral system boron nitride comprises mixing boric acid or borax with potassium cyanide and heating the mixture thereby obtained. In this process, the rhombohedral system boron nitride is obtained as a mixture with hexagonal system boron nitride. The two boron nitrides are alike in their chemical properties and specific gravities, and accordingly it has been impossible to isolate the rhombohedral system boron nitride from the mixture.

The rhombohedral system boron nitride is susceptible to high pressure phase transition by impact pressure and thereby readily converted into cubic system boron nitride. On the other hand, the hexagonal system boron nitride is converted into wurtzite structure boron nitride. The wurtzite structure boron nitride is inferior in its properties as grinding material to the cubic system boron nitride, since its hardness is low and sharp corners are hardly obtainable by cleavage. Thus, the boron nitride containing a great amount of hexagonal system boron nitride is inferior to pure rhombohedral system boron nitride, as a material for the production of high pressure type boron nitride for grinding.

Such inclusion of a substantial amount of hexagonal system boron nitride by the above-mentioned process is caused as follows. In the formation of boron nitride, the higher the reaction temperature becomes, the more readily, hexgonal system boron nitride tends to form. Therefore, the production of the rhombohedral system boron nitride is carried out at a relatively low temperature. Under such a low temperature condition, a pair of boric acid reacts with potassium cyanide to form potassium borate, which will then remain in a molten state in the reaction system. When borax is used as the starting material, the borax and potassium borate will form a mixed molten solution, which will then remain in the reaction system. These alkali metal borates facilitate the conversion of the boron nitride to hexagonal system boron nitride. Thus, the presence of the alkali metal borates gives rise to the formation and inclusion of the hexagonal system boron nitride.

SUMMARY OF THE INVENTION

It is an object of the present invention to provide a process for producing rhombohedral system boron nitride having high purity and good crystallinity with minimal inclusion of hexagonal system boron nitride.

The present invention provides a process which comprises heating a boron material selected from the group consisting of boron oxide, boric acid and an oxygen-containing boron compound capable of forming boron oxide when heated, at a temperature of from 1200° to 2100° C. to vaporize boron oxide and reacting the vaporized boron oxide with hydrogen cyanide or cyanogen gas.

BRIEF DESCRIPTION OF THE DRAWINGS

FIG. 1 is a vertically cross sectional view of a horizontal graphite tubular resistance furnace;

FIG. 2 is a vertically cross sectional view of a vertical high frequency heating furnace;

FIG. 3 is an X-ray diffraction diagram, by a copper $K\alpha$ ray, of the rhombohedral system boron nitride obtained by Example 1.

DETAILED DESCRIPTION OF THE PREFERRED EMBODIMENTS

Figure 1:
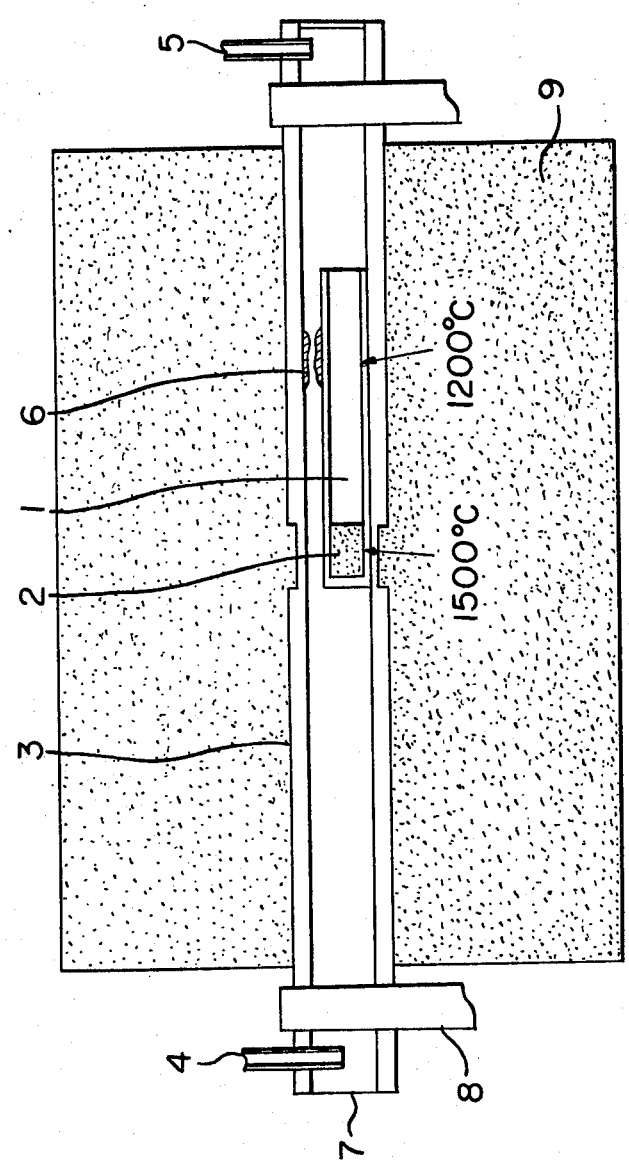
FIGS. 1 and 2 illustrates furnaces adapted to carry out the process of the present invention.

As the boron material, there may be used not only boron oxide but also boric acid or an oxygen-containing boron compound capable forming boron oxide when heated, such as borax or ammonium borate.

The boron material is usually used in a form of powder. In such a case, it is preferred to use the material as a mixture with boron nitride or alumina powder to increase the surface area in a molten state. Instead of the boron material mixed with boron nitride, crude boron nitride containing boron oxide as an impurity may be per se used.

Such a boron material is placed in a graphite crucible. The graphite crucible is suitable to permit the heated boron oxide to diffuse and evaporate outside the crucible, and it is superior in that it is stable against erosion by the atmosphere and the materials under the reducing atmosphere, and it is inexpensive.

The graphite crucible containing the boron material is placed in a graphite tubular furnace, and the material-containing portion is heated at a temperature of from 1200° to 2100° C., preferably from 1500° to 1900° C. If the temperature is lower than 1200° C., the vaporization of the boron oxide will be too slow. On the other hand, if the temperature is higher than the upper limit, the material tends to be scattered due to abrupt vaporization, the crucible tends to be eroded, or hexagonal system boron nitride tends to be abundantly formed at the high temperature region.

In the graphite tubular furnace, a gas containing hydrogen cyanide or cyanogen is preliminarily circulated. The hydrogen cyanide or cyanogen gas may be circulated per se. However, it is preferred to circulate it as a mixture with nitrogen, ammonia, hydrogen or other reducing gas, or with an inert gas, for safety purposes. As an industrially advantageous method, there may be mentioned a method wherein a reducing gas containing hydrogen cyanide or cyanogen as an impurity, such as coal gas or water gas, is used per se, or a method in which a mixture of carbon monoxide and ammonia, a mixture of hydrogen carbide, ammonia and oxygen, or a gas obtained by reacting heated carbon and water in nitrogen gas, is used.

The boron oxide vaporized outside the crucible is then reduced by the hydrogen cyanide gas or the cyanogen gas, the precipitates as rhombohedral system boron nitride, on the outer wall of the crucible or the inner wall of the heating element in the vicinity of the down stream of the material-heating portion where the temperature is about 1200° C. The form of the precipitates is white cotton-like, and was found to be a coalescence of beard-like crystals elongated in the c-axis expressed with hexagonal system notation and having a diameter of about one micron, by the electron microscopic observation.

According to the process of the present invention, rhombohedral system boron nitride having purity of at least 90% and good crystallinity is obtained without being accompanied by a substantial amount of hexagonal system boron nitride as in the conventional process. The rhombohedral boron nitride thus obtained has superior effects such that when used as a starting material for the synthesis of cubic system boron nitride by an impact-pressure method, cubic system boron nitride is obtainable in good yield, and a grinding material having good quality can thereby be obtained which is not accompanied by wurtzite structure boron nitride.

EXAMPLE 1

FIG. 1 illustrates a case where a horizontal graphite tubular resistance furnace was used. FIG. 1 is a vertical cross section of the furnace.

In a graphite crucible 1, amorphous boron nitride 2 containing about 10% of $B_2O_3$ was placed, and this portion was heated at 1500° C. by heating a graphite tubular heating element 3 by an electrode 8. In the furnace, a gas generated by passing nitrogen gas containing about 3% of water through carbon heated at 1500° C., and comprising $N_2$, CO, $H_2$ and HCN as the principal components, was preliminarily supplied at a rate of about 3 liters per minute from a gas inlet 4 and withdrawn from a gas outlet 5, to fill the inside of the furnace with the gas atmosphere.

The material-containing portion was heated at 1500° C. while maintaining the temperature gradient to be 30° C./cm toward the down stream of the gas from the crucible, and about 20 minutes later, white cotton-like rhombohedral system boron nitride 6 formed on the outer wall of the crucible and the inner wall of the heating element at the down stream of the gas where the temperature was about 1200° C. This rhombohedral system boron nitride was observed by an electron microscope, and it was found to be a coalescence of beard-like crystals elongated in the direction of the c-axis with hexagonal system notation and having good crystallinity and a diameter of about one micron. In the FIGURES, reference numeral 7 designates a temperature measuring window, and numeral 9 designates carbon black. The X-ray diffraction diagram of the rhombohedral system boron nitride was as shown in FIG. 3.

EXAMPLE 2

The same furnace and sample as used in Example 1 were used. Moisture was preliminarily supplied into the furnace, to permit the graphite tubular heating element 3 and heat insulator carbon black 9 to absorb the moisture, and while circulating nitrogen gas in the furnace, heating was conducted in the same temperature conditions as in Example 1. About 20 minutes later, white cotton-like rhombohedral system boron nitride formed.

EXAMPLE 3

Figure 2:
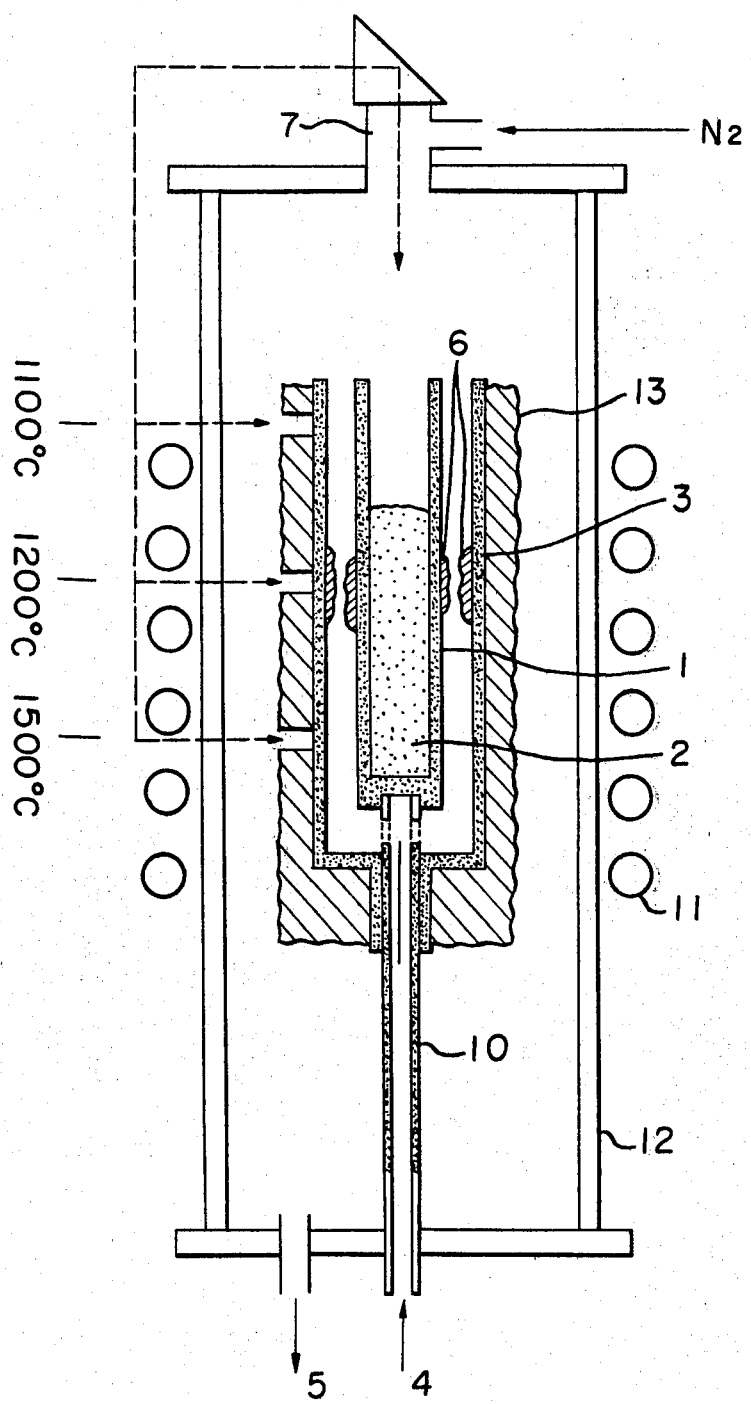

In this Example, a vertical furnace shown in FIG. 2 was used. FIG. 2 is a vertical cross section of the furnace.

A mixture 2 composed of 10% by weight of $B_2O_3$ and 90% by weight of boron nitride was placed in a graphite crucible 1 and heated. This furnace was a high frequency heating furnace equipped with a graphite heating element 3. Reference numeral 11 is a work coil, numeral 10 is a graphite pipe, numeral 12 is a quartz tube, and numeral 13 is a carbon felt. Nitrogen gas containing 1% of hydrogen cyanide gas was circulated at a rate of one liter per minute between the cruicible 1 and the graphite heating element 3. The material-containing portion was maintained at 1500° C. and the inner wall of the heating element 3 and the outer wall of the crucible 1 were maintained at about 1200° C., whereupon white cotton-like rhombohedral system boron nitride was obtained at the region in the vicinity of 1200° C.

Each rhombohedral system boron nitride obtained in each Example was mixed with copper powder, and exposed to a pressure region for the formation of cubic system boron nitride by a impact-pressure method. The sample thereby recovered was treated with an aqueous solution containing about 10% of nitric acid, whereupon the copper was dissolved and removed, and precipitates were collected. The precipitates contained at least 80% of cubic system boron nitride, the rest being nonconverted normal pressure phase boron nitride, and no wurtzite structure boron nitride was detected. Accordingly, the cubic system boron nitride can readily be separated by a heavy liquid method.

EXAMPLE 4

The same furnace and sample as used in Example 3 were used. Nitrogen gas containing 10% of cyanogen gas was circulated at a rate of one liter per minute betweem the crucible 1 and the graphite heating element 3 of FIG. 2 and heating was conducted in the same temperature conditions as in Example 3. Rhombohedral system boron nitride was obtained in almost the same formation status as in Example 3.

We claim:

1. A process for producing high-purity rhombohedral system boron nitride, having good crystallinity, which comprises heating a boron material selected from the group consisting of boron oxide, boric acid and an oxygen-containing boron compound capable of forming boron oxide when heated, at a temperature of from 1200° to 2100° C., thereby vaporizing the boron oxide and reacting the vaporized boron oxide with hydrogen cyanide or cyanogen gas.

2. The process according to claim 1 wherein said hydrogen cyanide is introduced in a form of a reducing gas containing hydrogen cyanide obtained by the reaction of nitrogen, water-containing gas and carbon.

3. The process according to claim 1 wherein said boron material is mixed with boron nitride or alumina powder.

4. The process according to claim 1 wherein said hydrogen cyanide or cyanogen gas is introduced together with a reducing gas or an inert gas.

5. The process according to claim 1 wherein said hydrogen cyanide or cyanogen gas is introduced together with nitrogen, ammonia or hydrogen.

6. The process according to claim 1 wherein said hydrogen cyanide or cyanogen gas is introduced in a form of a coal gas or water gas containing it.

7. The process according to claim 1 wherein said hydrogen cyanide or cyanogen gas is introduced together with carbon monoxide and ammonia.

8. The process according to claim 1 wherein said hydrogen cyanide or cyanogen gas is introduced together with hydrogen carbide, ammonia and oxygen.

9. The process according to claim 1 wherein said boron material is heated at a temperature of from 1500° to 1900° C.

10. The process according to claim 1 wherein said oxygen-containing boron compound is borax or ammonium borate.

* * * * *